Figure 1:
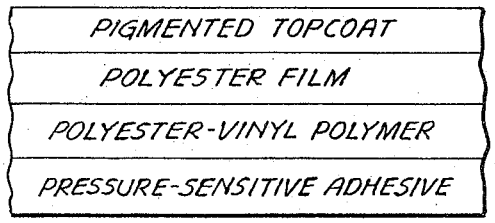

April 4, 1967  J. J. RUSCH  3,312,563
DECORATIVE ADHESIVE SHEET MATERIAL WITH A CHLORINATED
VINYL POLYMER-POLYESTER RESIN BLEND PRIMER
Filed Oct. 23, 1963

INVENTOR
JOSEPH J. RUSCH
BY
Carpenter, Abbott, Coulter & Kinney
ATTORNEYS

United States Patent Office 3,312,563
Patented Apr. 4, 1967

3,312,563
DECORATIVE ADHESIVE SHEET MATERIAL
WITH A CHLORINATED VINYL POLYMER-
POLYESTER RESIN BLEND PRIMER
Joseph J. Rusch, St. Paul, Minn., assignor to Minnesota
Mining and Manufacturing Company, St. Paul, Minn.,
a corporation of Delaware
Filed Oct. 23, 1963, Ser. No. 318,781
9 Claims. (Cl. 117—33.3)

This application is a continuation-in-part of Ser. No. 240,573, filed Nov. 28, 1962, now abandoned.

This invention relates to adhesive sheet material, especially to pressure-sensitive emblems for aircraft marking and outdoor signs.

Modern airplanes bear a wide variety of markings, e.g., stripes, numbers, and identifying insignia, ranging in size from a few square inches to strips perhaps 3 feet wide and 10 feet long. The conditions to which an airplane is subjected in normal flying operations are such that the exterior surface—and in particular the markings—must endure rain, sleet, sunlight, vibration, air velocities of several hundred miles an hour, and temperatures ranging as low as −65° F. A typical airplane may encounter all these conditions within the span of only a few minutes. Jet airplanes are also exposed to oils which have a deleterious effect on markings, and the tail surfaces may be subjected to temperatures as high as 350° F. during landing.

Users of commercial and military aircraft have tried many techniques for applying markings to the fuselage, wings and tail surfaces, but prior to my invention none has been completely satisfactory. Alkyd resins are simple to apply, but the painting operation requires an extended period of time; further, the oils which are always present on an airplane tend to attack alkyd resins and greatly decrease their useful life. In addition, alkyd resins become stiff and brittle when subjected to extremely cold conditions, and frequently flake off and destroy the integrity of the markings. Epoxy paints have been tried as substitutes for alkyds, but although their adhesion is superior and their flexibility is satisfactory, the down time required for the application and cure of the resin has made this technique expensive.

Pressure-sensitive adhesive labels are particularly convenient to apply, since they need only be firmly pressed against the surface to be marked to complete the job. To date, however, no such labels have been completely satisfactory. Thus, although plasticized polyvinyl chloride films are inexpensive and can be printed attractively, they are dissolved by oils and tend to crack and check when exposed to the extreme vibration and rapid temperature changes previously discussed. Oriented polyester films have been tried as the base for pressure-sensitive adhesive labels, but such films are so strong and the bonding of the adhesive to the films so weak that the entire label delaminates and is ripped away, often after only a single flight. Even so, the ease of applying such labels has resulted in their wide acceptance by the users of airplanes.

I have now devised a decorative pressure-sensitive adhesive sheet material which can be used in the manufacture of outdoor signs and labels and successfully subjected to a wide variety of operating conditions for extended periods of time. One preferred embodiment of my novel sheet material is capable of being exposed to temperatures ranging from −65° F. to 350° F. and subjected to vibration, extreme environmental variations, and the oils normally present on aircraft without failure. Another preferred embodiment of my novel sheet material can be adhered to a panel, exposed to freezing, thawing, sunlight, microorganisms, dust, snow, hail, rain, dew, cleaning fluid, etc., for long periods of time without significant change, and thereafter stripped easily and cleanly from the panel.

My invention comprises a self-supporting polymeric film comprising a polyester polymer, to one surface of which a normally tacky and pressure-sensitive adhesive layer is bonded. The presently preferred embodiment of my invention comprises an oriented linear polyester backing, to one surface of which a pressure-sensitive adhesive is firmly adherently bonded by means of an intervening primer layer. A preferred polyester backing for use in my invention is biaxially oriented polyethylene terephthalate, commercially available under the trade name "Mylar," and the examples appearing herein will be directed to structures made thereon. Other orientable polyester materials may be employed, however, e.g., "Videne" film, believed to be a copolyester of ethylene isophthalate and ethylene terephthalate, or "Kodar," believed to be formed by reacting terephthalic acid, isophthalic acid, and cyclohexane dimethanol. The polyester films, the primer layer, and/or the pressure-sensitive adhesive may, of course, include such materials as ultraviolet light absorbers, e.g., as disclosed in U.S. Patent No. 3,043,709 or British Patent No. 872,421.

The primer layer employed in the practice of my invention may be colored, opacified with pigment, or clear, depending on the product's end use, and contains a homogeneous blend of from about 15 to about 90 parts of a flexible soluble vinyl polymer and correspondingly from about 85 to 10 parts of a soluble saturated polyester resin. A reliable, easily prepared blend is made from equal amounts of a 50:50 ethylene terephthalate:ethylene isophthalate copolyester and a compatible vinyl polymer. Where the primer layer has adequate strength it may be employed as a self-supporting autogenously primed film. In general, the greater the amount of polyester present in the polyester:vinyl blend, the greater the strength and resistance to oils, solvents and heat of films formed therefrom but the more expensive the final structure.

"Soluble" as used herein means that the polymer dissolves to the extent of at least 5% in 1,1,2-trichloroethane. The term "polyester" is intended to exclude alkyd resins, which contain fatty monobasic acids as oil modifications. "Homogeneous" means that a film of the polymer blend coated on glass shows no islands of incompatibility after evaporation of the solvent. The molecular weight of the polyester employed in the primer layer is ordinarily such that its intrinsic viscosity * ranges between about 0.3 and about 0.9. The higher the intrinsic viscosity the better the weather resistance of the polymer but the more difficult it is to dissolve, and hence the more inconvenient it is to apply. In general, an intrinsic viscosity ranging between about 0.65 and 0.80 has been found to be extremely satisfactory.

Various polyester polymers may be employed in the primer layer provided that they are compatible with the polyester of which the backing is formed. Where the backing is biaxially oriented polyethylene terephthalate, the polyester polymer employed in the primer layer is preferably a copolyester containing on the order of ⅓ to

---

*As used herein, intrinsic viscosity, denoted by the symbol $(n)_0$, is a measure of the degree of polymerization of a polyester and may be defined as:

$$\text{limit of } \frac{\ln (n)_r}{C} \text{ as C approaches 0}$$

wherein $(n)_r$ is the viscosity of a dilute phenol-tetrachloroethane (60/40) solution of the polyester divided by the viscosity of the phenol-tetrachloroethane mixture per se measured in the same units at the same temperature and C is the concentration in grams of polyester per 100 cc. of solution.

⅔ ethylene terephthalate units and correspondingly from ⅔ to ⅓ ethylene isophthalate units. In general, increasing the amount of ethylene terephthalate in such copolyesters to as high as 80% yields primer layers which are strong and durable; such copolyesters however are increasingly difficult to dissolve and the primer layer as will be hereinafter indicated is preferably cast from solution. The amount of ethylene isophthalate present can range as high as 100% of the polyester employed provided however that it does not exceed about 60% of the polymer present in the primer blend. Primer layers containing greater amounts of ethylene isophthalate tend to provide insufficient delamination resistance in the finished sheet material the pressure-sensitive adhesive having inadequate affinity for the primer layer.

The vinyl portion of the primer layer includes those polymers which are compatible with the polyester system employed i.e. a dried film of the blend presents a homogeneous appearance indicating mutual solubility. Generally I prefer to use vinyl polymers in which the major constituent is a polymer of a halogenated vinyl monomer. I have found that where polyesters comprising ethylene isophthalate units are employed in the primer layer such commercially available vinyl polymers as "Vinylite VAGH" and "Geon 222" (respectively a copolymer of approximately 91% vinyl chloride 3% vinyl acetate and 6% vinyl alcohol and a modified 1:3 vinyl chloride: vinylidene chloride copolymer) are very satisfactory.

The aircraft industry generally prefers to use labels having an overall white appearance; hence where my novel product is to be applied to airplanes, I usually include a white pigment, e.g., titanium dioxide, in the primer layer and apply a similar pigmented topcoat to the opposite side of the backing. Titanium dioxide also serves as an ultraviolet light barrier, retarding degradation of the polyester film and the pressure-sensitive adhesive. Filler such as calcium carbonate may be included in the topcoat to enhance writability. The desired indicia are then applied to the topcoat, e.g., by a silk screen process, and, if desired, protected by a clear acrylic coating.

Products for outdoor advertising signs may also be made in accordance with my invention, as described above. Where such signs are applied over an internally illuminated translucent base, pigments and fillers are ordinarily omitted from both the primer and the topcoat. To enhance the resistance of the polyester film, the primer, and the pressure-sensitive adhesive to ultraviolet light, and thereby render such signs both more durable and more readily removable, it is desirable to include an ultraviolet light-absorbent material (e.g., 2-hydroxy-4 methoxy benzophenone, such as "Uvinul M-40," sold by General Aniline and Film Corporation) in the polyester film backing or a coating thereover. The effectiveness of such ultraviolet light absorbent materials may be checked by coating one surface of the film with a fluorescent dye, shining "black light" (e.g., from Sylvania tubular lamp F-4T5BLB) through from the opposite face, and noting the decrease in fluorescence compared to a similarly dye-coated unprotected film.

In the practice of my invention I prefer to use pressure-sensitive adhesives which are regarded as polar, since their affinity for both the primer layer and metal airplane surfaces is outstanding. Particularly preferred materials are those adhesives disclosed in Ulrich Reissue Patent 24,906, viz., copolymers of (a) monomeric acrylic acid esters which can be homopolymerized to a sticky stretchable elastic adhesive and (b) one or more of the following monomers: acrylic acid, methacrylic acid, itaconic acid, acrylamide and methacrylamide. Adhesives of this type are resistant to ultraviolet light, whereas other pressure-sensitive adhesives may require the presence of an ultraviolet light absorbent material to prevent degradation. Other polar adhesives include phenol-formaldehyde modified acrylates of the type disclosed in Ebel U.S. Patent 2,553,816, and phenol-formaldehyde modified Buna N-based pressure-sensitive and solvent- or heat-activatable adhesives. Where the label or sign is to be removed readily, less aggressive, or less polar, adhesives are preferred. Acrylate adhesives as a class are transparent, and their ultraviolet light-resistance minimizes any tendency to change in either adhesion or transparency, making the less polar acrylate especially desirable for removably adhering insignia to internally illuminated signs.

Figure 2:
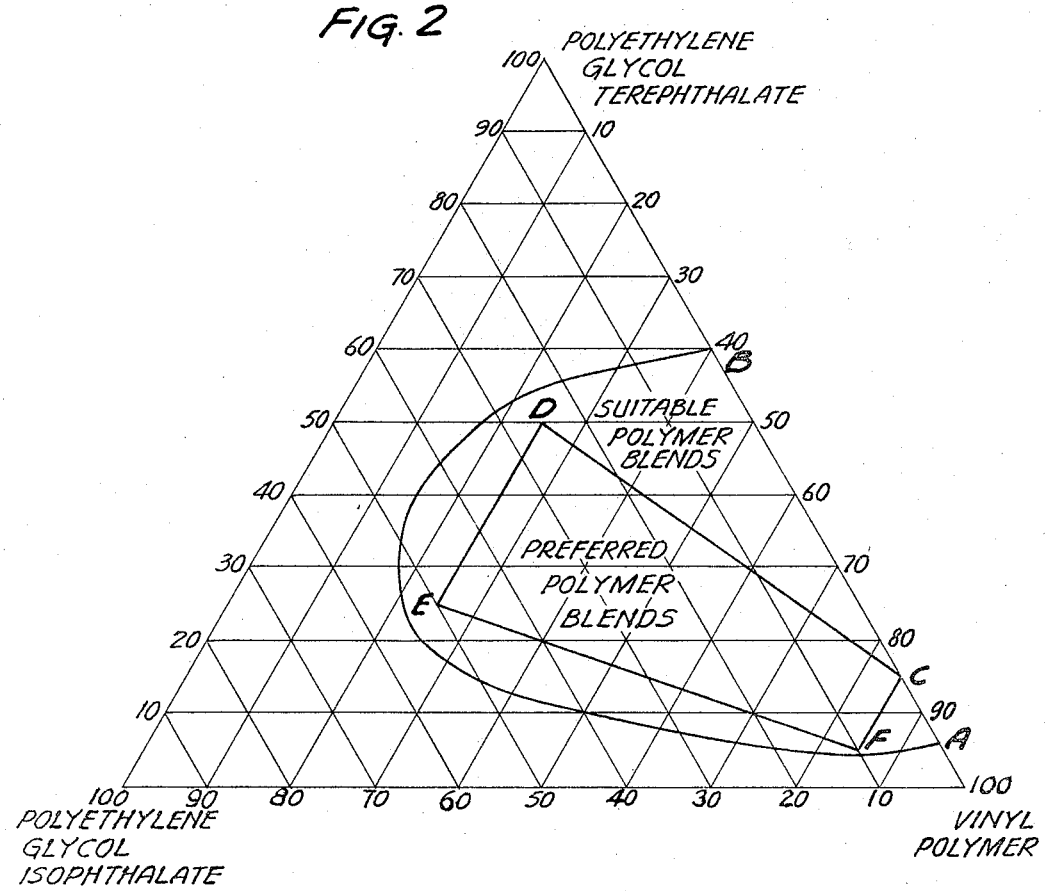

My invention is illustrated in the attached drawing, in which:

FIGURE 1 illustrates in cross-section a preferred form of my novel sheet material, and FIGURE 2 shows the composition of polyester-vinyl polymer blends which may be used to prepare primer coatings for polyethylene terephthalate films, the area delineated by line ABA including suitable blends and the area delineated by line CDEFC including preferred blends. All percentages are by weight.

My invention will be further illustrated by the following illustrative but non-limiting examples, in which all parts are by weight unless otherwise noted:

*Example 1*

A 50:50 copolyester was prepared by polymerizing equimolar quantities of dimethyl terephthalate and dimethyl isophthalate with ethylene glycol according to well-known procedures, the ultimate polymer having an intrinsic viscosity of 0.65.

A primer solution was prepared by blending 7.5 parts of the copolyester described in the preceding paragraph, 7.5 parts of "Vinylite VAGH," 7.5 parts of titanium dioxide pigment, and 85 parts of 1,1,2-trichloroethane. This composition was then ball-milled for approximately 60 hours to effect uniform distribution of pigment particles, the composition then having a Hegman paint gauge reading of 7 out of 8 according to ASTM Test D1210–54. This composition was then applied to one surface of 0.001″ "Mylar" film by means of a knife coater, a 0.003″ aperture being provided between the face of the film and the knife. The coated film was then dried in a 225° F. circulating air oven for 2 minutes.

A 25% solids solution of a pressure-sensitive isoamyl acrylate:acrylic acid copolymer adhesive of the type described in Example 1 of Ulrich Reissue patent 24,906 was applied to the surface of a polyethylene coated paper liner sheet, the aperture between the polyethylene surface and the knife being approximately .008 inch. The solvent was then evaporated by passing the adhesive-coated liner sheet through an oven maintained at 150° F. for 5 minutes and 200° F. for 2 minutes.

The primed polyester film and the pressure-sensitive adhesive coated paper liner were now superimposed and passed through a pair of squeeze rolls to laminate the adhesive to the primed surface.

A topcoat composition was prepared by blending 16.6 parts of the polyester described in the first paragraph of this example, 3.4 parts of "Vinylite VAGH," 16.4 parts of finely divided titanium dioxide, and 80 parts of 1,1,2-trichloroethane, and thereafter ball-milling the composition for 60 hours. This topcoat composition was applied to the exposed surface of the polyester film by means of a knife coater, a 0.005 inch aperture being maintained between the surface of the film and the knife.

The coated composite material was then placed in a 200° F. circulating air oven for 10 minutes, the heat serving the dual function of evaporating the solvent from the topcoat and firmly bonding the pressure-sensitive adhesive to the primer layer.

To measure the performance of the pressure-sensitive adhesive sheet material prepared in accordance with this example, 1″ x 6″ samples were die cut from the composite structure. The polyethylene coated liner was then removed and the adhesive surface applied directly to a clean, degreased aluminum panel using a 2″ diameter rubber roller weighing 4.5 lbs. The test panel was allowed to remain for 48 hours, after which an operator grasped one end of the strip and attempted to remove the strip from the panel. The procedure generally followed was to hold the panel firmly against a desk top with one hand and to slowly pull the strip, with a slight side to side motion, at approximately 90° to the surface of the panel, noting the result. This test is commonly conducted at both room temperature (72° F.) and −65° F. It has been found that this qualitative test is more reliable in predicting commercial performance than any quantitative test of which I am aware. If failure is likely to occur between the primer and the film, between the primer and the adhesive, or elsewhere within the structure, in actual commercial use, such failure is readily predictable by delamination of the composite structure in this test. Ideally, no delamination whatsoever occurs, either the polyester film tearing or the entire structure stripping cleanly from the aluminum test panel at 72° F. and the polyester film tearing at −65° F. When tested in this manner, the product of this example failed by tearing at both 72° F. and −65° F.

*Example 2*

This example illustrates the preparation of a sign for application to a translucent internally illuminated support.

A primer solution was prepared by dissolving 2.5 parts of the copolyester described in Example 1 and 2.5 parts of "Vinylite VAGH" in 95 parts of cyclohexanone. A 1-mil biaxially oriented film, formed from polyethylene terephthalate containing a small amount of 2-hydroxy-4-methoxybenzophenone, was then coated on each side with sufficient primer solution to leave 1 grain of solid material per 24 square inches and the solvent evaporated.

A 20% heptane solution of a 1:1 methyl isoamyl acrylate:fusel oil acrylate copolymer pressure-sensitive adhesive was then applied to the surface of a silicone-treated release liner (kraft paper coated with a cross-linked dimethyl polysiloxane) and the heptane evaporated in a convection oven. The adhesive-coated surface of the liner was then applied to one surface of the primed polyester film, and the resulting laminate wound on itself in roll form.

The laminate described in the preceding paragraph was next cut into sheets for processing. Acrylic paints, in the form of process pastes, were then silk screened in suitable design on the exposed primed surface of the polyester film to a thickness of 0.5–1 mil, allowing 24 hours of room temperature drying between coats. Such paints may be transparent, translucent, or opaque. A clear coat of acrylic resin was then applied over the design and allowed to dry for 24 hours. Samples of the resultant product were cut to the desired shape, the release liner removed, and the emblems carefully applied to smooth translucent methyl methacrylate panels of the type used in internally illuminated signs. These panels were then mounted to face south and exposed to ambient weather conditions in Houston, Texas, Miami, Florida, and St. Paul, Minnesota, for over a year without significant change in apperance and without delaminating or separating from the panels. At the end of this time the emblems could be readily removed from each of the panels without breaking or being delaminated, even in those areas where the adhesive was not protected by acrylic paint. The methyl methacrylate panels from which the emblems had been removed showed no sign of residual pressure-sensitive adhesive.

To illustrate a few of the numerous compositions which can be successfully employed as primers in the practice of my invention, additional examples are set forth in tabular form below. In each case, the general structure, coating techniques, pressure-sensitive adhesive, and test procedures were the same as those described in the preceding detailed Example 1. Pigmented primer compositions contained ⅓ titanium dioxide by weight. Where delamination between primer and backing occurred during testing, the notation "PB" occurs in the table, delamination of the primer from the adhesive being similarly termed "PA."

| Ex. | Primer | | | | | Performance | |
|---|---|---|---|---|---|---|---|
| | Pigment | Vinyl Polymer | Polyester Polymer | | Vinyl: Polyester Ratio | | |
| | | | Ethylene-Terephthalate | Ethylene Isopthalate | | 72° F. | −65° F. |
| 3 | No | "VAGH" | 50 | 50 | 90:10 | Complete removal of adhesive from panel. | Film broke. |
| 4 | No | "VAGH" | 0 | 100 | 83:17 | ___do___ | Do. |
| 5 | No | "VAGH" | 50 | 50 | 83:17 | ___do___ | Do. |
| 6 | No | "VAGH" | 0 | 100 | 75:25 | ___do___ | Slight PA. |
| 7 | No | "VAGH" | 15 | 85 | 75:25 | ___do___ | Film broke. |
| 8 | Yes | "VAGH" | 30 | 70 | 75:25 | Film broke | Do. |
| 9 | Yes | "VAGH" | 50 | 50 | 75:25 | ___do___ | Do. |
| 10 | Yes | "VAGH" | 60 | 40 | 75:25 | ___do___ | Do. |
| 11 | Yes | "VAGH" | 70 | 30 | 75:25 | ___do___ | Do. |
| 12 | Yes | "VAGH" | 0 | 100 | 50:50 | ___do___ | Partial PB. |
| 13 | No | "VAGH" | 15 | 85 | 50:50 | Slight PA | Slight PA. |
| 14 | Yes | "VAGH" | 30 | 70 | 50:50 | Film broke | Partial PA. |
| 15 | Yes | "Geon 222" | 50 | 50 | 50:50 | ___do___ | Film broke. |
| 16 | Yes | "VAGH" | 60 | 40 | 50:50 | ___do___ | Partial PA. |
| 17 | Yes | "VAGH" | 70 | 30 | 50:50 | ___do___ | Film broke. |
| 18 | Yes | "VAGH" | 30 | 70 | 25:75 | Very slight PB | Do. |
| 19 | Yes | "VAGH" | 50 | 50 | 25:75 | Film broke | Do. |
| 20 | Yes | "VAGH" | 70 | 30 | 25:75 | Partial PB | Do. |
| 21 | No | "VAGH" | 50 | 50 | 17:83 | Partial PA | Do. |

The preceding examples show that structures made with primer compositions falling within area CDEFC in FIGURE 2 generally do not delaminate at either 72° F. or −65° F. Structures made with primers lying outside area CDEFC but within area ABA tend to show a slight degree of delamination when tested at 72° F., −65° F., or both. All of the preceding examples, however, are outstanding in comparison with prior art structures.

What I claim is:

1. Adhesive sheet material comprising in combination a self-supporting polymeric film backing formed essentially from saturated ester components consisting essentially of ethylene terephthalate units, at least one surface of said backing being uniformly provided with a homogeneous blend consisting essentially of soluble chlorinated vinyl polymer and soluble polyester polymer consisting essentially of ethylene terephthalate units and ethylene isophthalate units and having an intrinsic viscosity in the range of about 0.3–0.9, said blend falling within the area CDEF of FIGURE 2 of the drawing, and an adhesive layer firmly adhered to said blend over said backing.

2. The sheet material of claim 1 wherein the chlorinated vinyl polymer is a copolymer of vinyl chloride and vinylidene chloride.

3. Pressure-sensitive adhesive sheet material comprising in combination a biaxially oriented polyethylene terephthalate film backing uniformly coated on one surface with a thin adherent homogeneous layer consisting essentially of a blend of soluble chlorinaated vinyl polymer and soluble polyester polymer, said blend falling within the area ABA of FIGURE 2 of the drawing, and a normally tacky and pressure-sensitive adhesive stratum firmly adhered to said layer.

4. A decorative pressure-sensitive adhesive label which can be firmly adhered to a metallic surface and which then maintains firm uniform contact therewith for weeks or months even when subjected to subzero temperatures, oil spray, and air velocities of several hundred miles per hour, said label comprising in combination a biaxially oriented polyethylene terephthalate film backing uniformly coated on one surface with a thin adherent opaque pigment containing polymer layer consisting essentially of a homogeneous blend of 15–90% soluble chlorinated vinyl polymer and correspondingly 85–10% random ethylene terephthalate:ethylene isophthalate copolyester having an intrinsic viscosity of at least about 0.3, a normally tacky and pressure sensitive acrylate adhesive firmly adhered to said layer, and an opaque pigment-containing printable coating comprising a second random copolyester similar in composition to the first copolyester adhered to the other surface of said backing.

5. Decorative adhesive sheet material comprising in combination; a biaxially oriented saturated polyester film backing having firmly adhered to one surface thereof a first pigmented polymer layer consisting essentially of a homogeneous blend of 15–90 parts of soluble chlorinated vinyl polymer and correspondingly 85–10 parts of soluble ethylene terephthalate-ethylene isophthalate copolyester having an intrinsic viscosity of at least about 0.3, said blend falling within the area ABA in FIGURE 2 of the drawing, an adhesive stratum firmly adhered to said first pigmented layer, said backing also having in direct contact with and firmly adhered to to the other surface thereof a second pigmented layer comprising a soluble ethylene terephthalate-ethylene isophthalate copolyester.

6. Pressure-sensitive adhesive sheet material comprising in combination an oriented linear polyethylene terephthalate film backing having uniformly adhered to one surface a thin adherent homogeneous primer layer consisting essentially of about 25–85% soluble vinyl polymer formed predominantly from vinyl chloride and correspondingly about 75–15% soluble copolyester, said copolyester having an inherent viscosity of at least about 0.3 and being randomly made up of about 1/3 /2/3 ethylene terephthalate units and correspondingly about 2/3 /1/3 ethylene isophthalate units, and a polar normally tacky and pressure sensitive adhesive layer firmly adherently bonded over said primer layer.

7. Decorative pressure-sensitive sheet material comprising in combination: a biaxially oriented polyethylene terephthalate film backing having a normally tacky and pressure-sensitive adhesive layer bonded to one surface by an intervening opaque primer layer consisting essentially of a homogeneous blend of approximately equal parts by weight of finely divided titanium dioxide, soluble chlorinated vinyl polymer, and soluble copolyester polymer, said copolyester polymer having an intrinsic viscosity of at least 0.3 and containing substantially equal numbers of ethylene terephthalate units and ethylene isophthalate units, said backing having firmly adhered to its other surface an opaque homogeneous top layer comprising finely divided titanium dioxide uniformly dispersed in a soluble ethylene terephthalate-ethylene isophthalate copolyester, and decorative markings applied to said top layer.

8. Decorative pressure-sensitive adhesive sheet material comprising an oriented linear polyester film provided on each surface with a firmly adhered layer consisting essentially of a homogeneous blend of 15–90 parts of soluble chlorinated vinyl polymer and correspondingly 85–10 parts of soluble ethylene terephthalate:ethylene isophthalate copolymer having an intrinsic viscosity of at least about 0.3, at least one of said layers being decoratively printed, and a normally tacky and pressure-sensitive adhesive stratum firmly bonded to said film over one of said layers.

9. Transparent pressure-sensitive adhesive sheet material having one non-adhesive surface, readily silk screen-printed with acrylic process pastes to provide a weather-resistant translucent insignia, and one adhesive surface, which sheet material can be adhered to, and after a year or more of outdoor exposure removed cleanly from, internally illuminated translucent signs, said sheet material comprising in combination: a biaxially oriented polyethylene terephthalate film backing having firmly bonded over each major surface a transparent homogeneous stratum consisting essentially of approximately equal parts by weight of soluble chlorinated vinyl polymer and soluble copolyester polymer, said copolyester polymer having an intrinsic viscosity of at least about 0.3 and containing substantially equal numbers of ethylene terephthalate units and ethylene isophthalate units, said backing having a clear normally tacky and pressure-sensitive adhesive firmly adhered to one of said strata, said backing being provided, at least at the surface opposite that over which the pressure-sensitive adhesive is adhered, with an ultraviolet light-absorbent material.

References Cited by the Examiner

UNITED STATES PATENTS

| | | | |
|---|---|---|---|
| Re. 24,906 | 12/1960 | Ulrich | 117—68.5 X |
| 2,039,998 | 5/1936 | Hollister | 40—135 |
| 2,311,249 | 2/1943 | Powell | 260—45.5 |
| 2,654,971 | 10/1953 | Harrison | 40—135 |
| 2,907,677 | 10/1959 | Hochberg | 117—68.5 |
| 3,010,846 | 11/1961 | Bach | 117—75 |
| 3,049,443 | 8/1962 | Coleman | 117—138.8 |
| 3,069,291 | 12/1962 | Levine et al. | 117—75 |
| 3,108,086 | 10/1963 | Russel et al. | 117—76 X |
| 3,120,564 | 2/1964 | Milinois et al. | 117—33.3 X |
| 3,149,997 | 9/1964 | Tamburro | 117—76 |
| 3,158,494 | 11/1964 | Eikvar et al. | 117—45 |
| 3,169,866 | 2/1965 | Lee et al. | 117—161 X |
| 3,190,197 | 6/1965 | Pinder | 117—161 X |

WILLIAM D. MARTIN, *Primary Examiner.*

W. D. HERRICK, *Assistant Examiner.*